Sept. 18, 1928.  1,685,035
W. E. ROBERTSON
HIGH SPEED TRANSPORTATION SYSTEM
Filed June 3, 1927  4 Sheets-Sheet 1
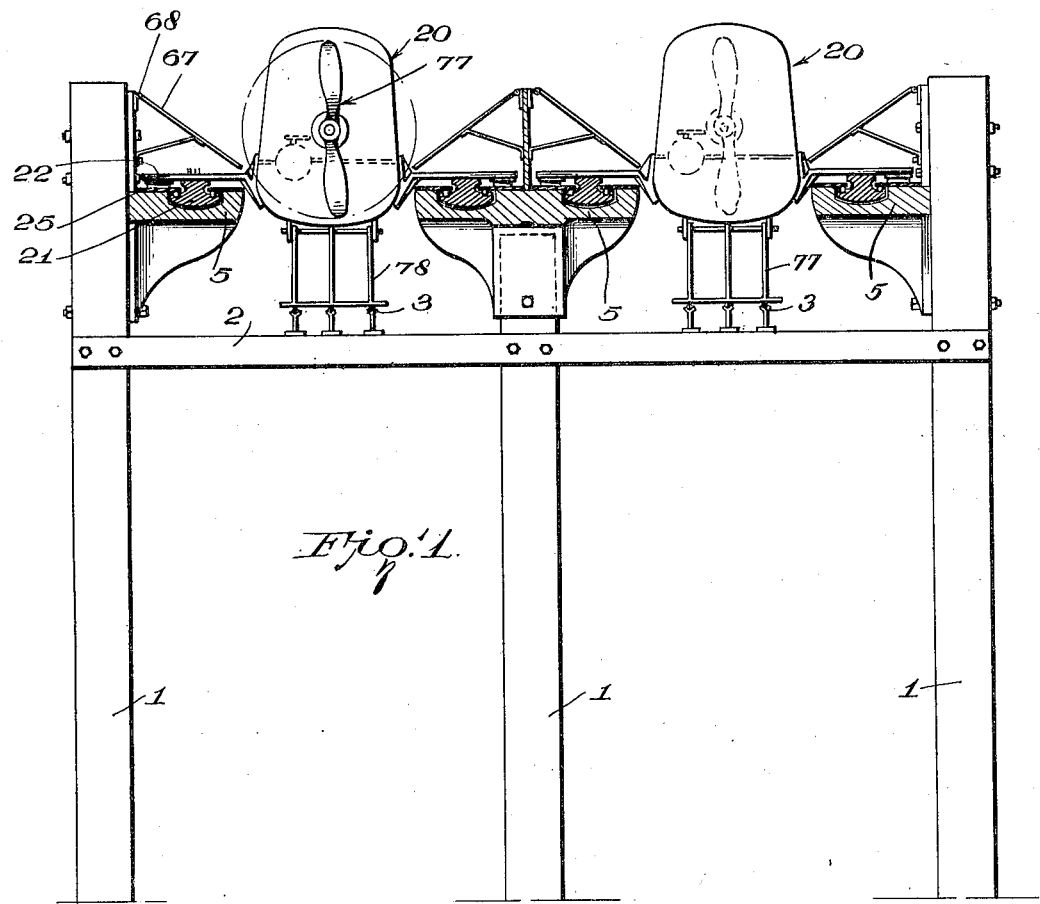
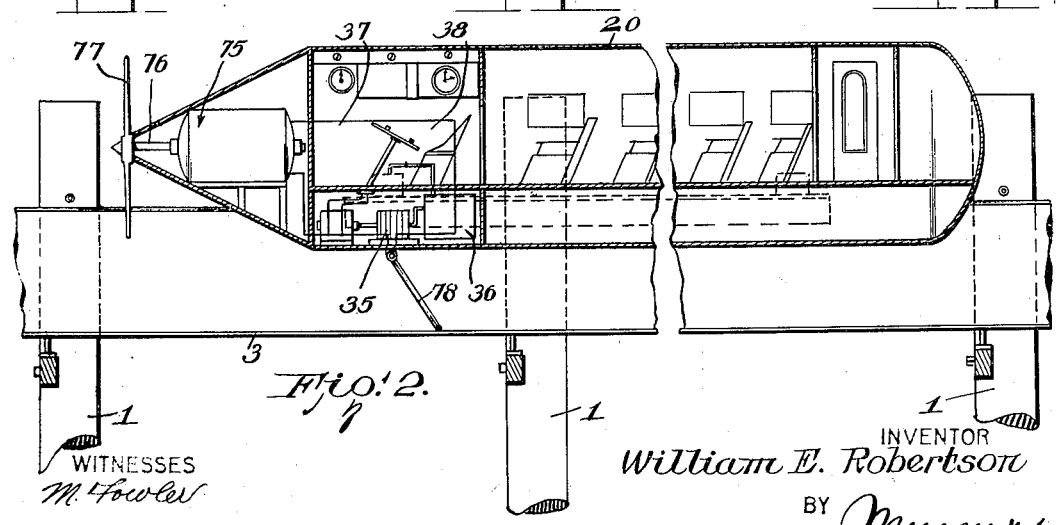
INVENTOR
William E. Robertson
BY
ATTORNEY Sept. 18, 1928. 1,685,035
W. E. ROBERTSON
HIGH SPEED TRANSPORTATION SYSTEM
Filed June 3, 1927 4 Sheets-Sheet 2
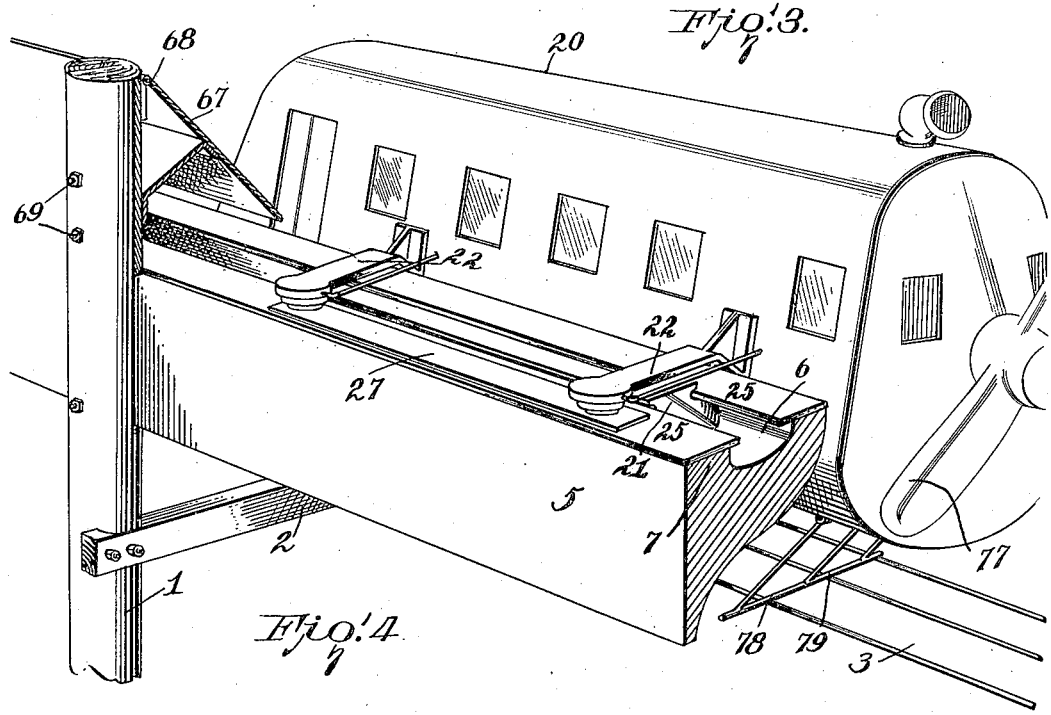
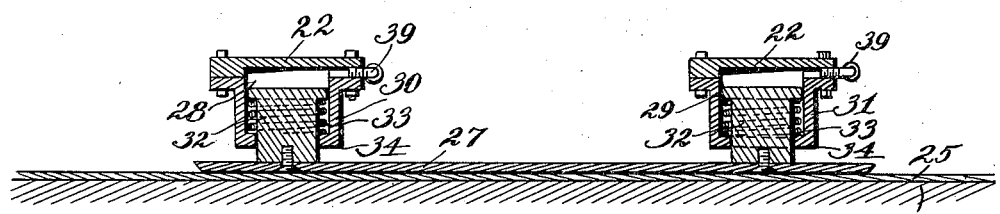
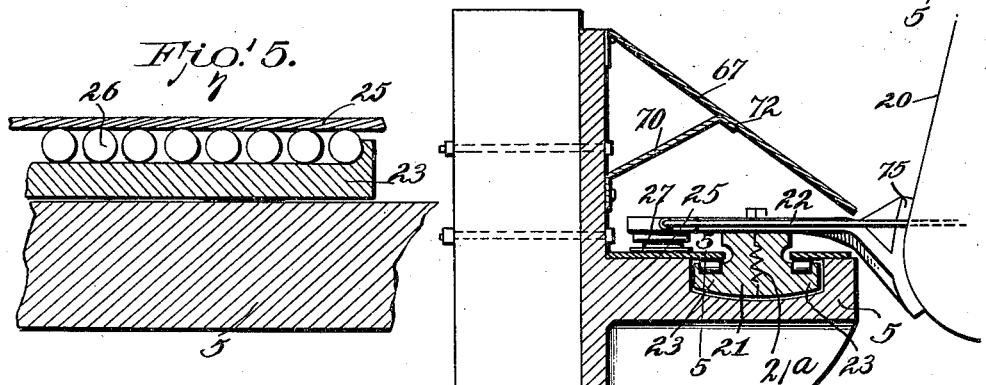
WITNESSES
M. Fowler
INVENTOR
William E. Robertson
BY
ATTORNEY Sept. 18, 1928.
W. E. ROBERTSON
1,685,035
HIGH SPEED TRANSPORTATION SYSTEM
Filed June 3, 1927    4 Sheets-Sheet 3
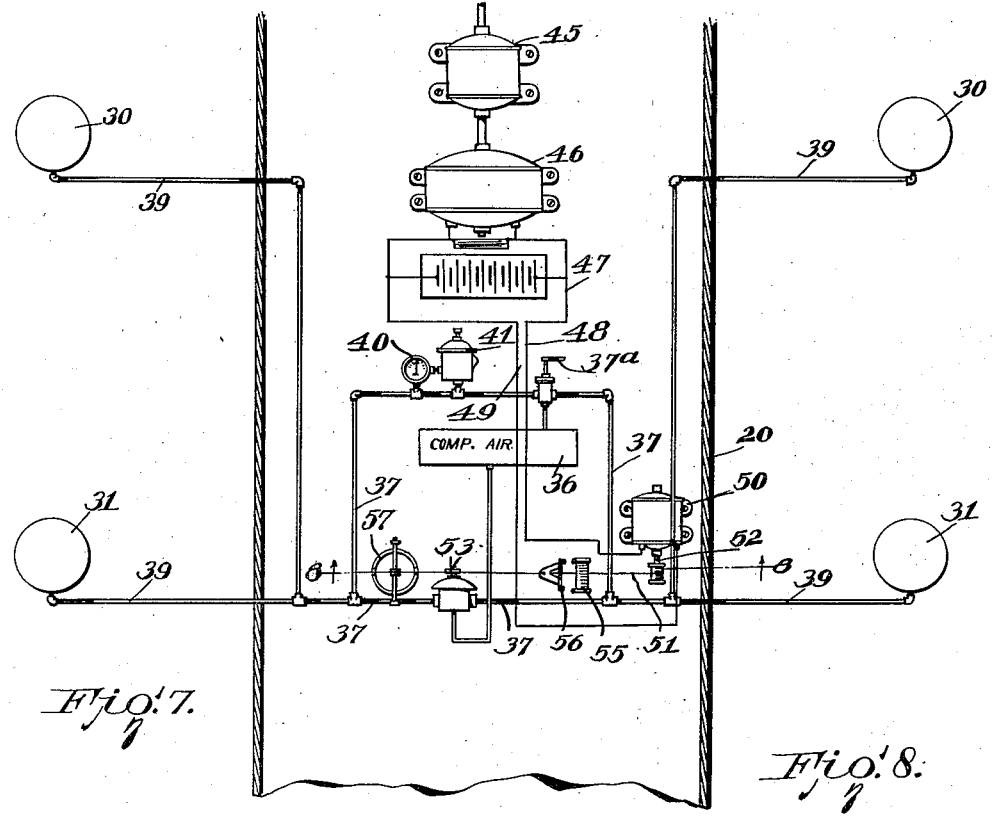
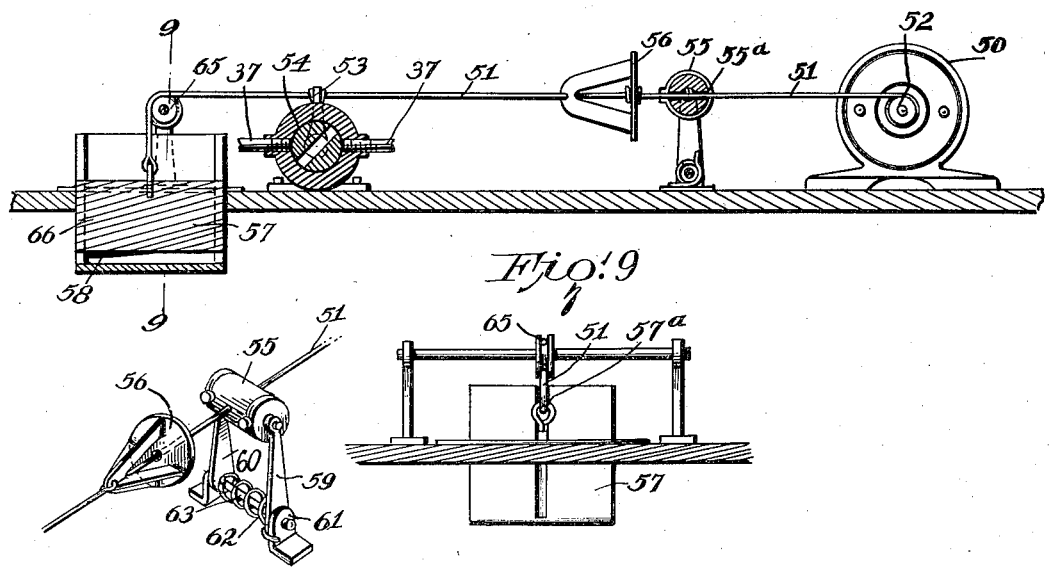
WITNESSES
INVENTOR
William E. Robertson
BY
ATTORNEYS

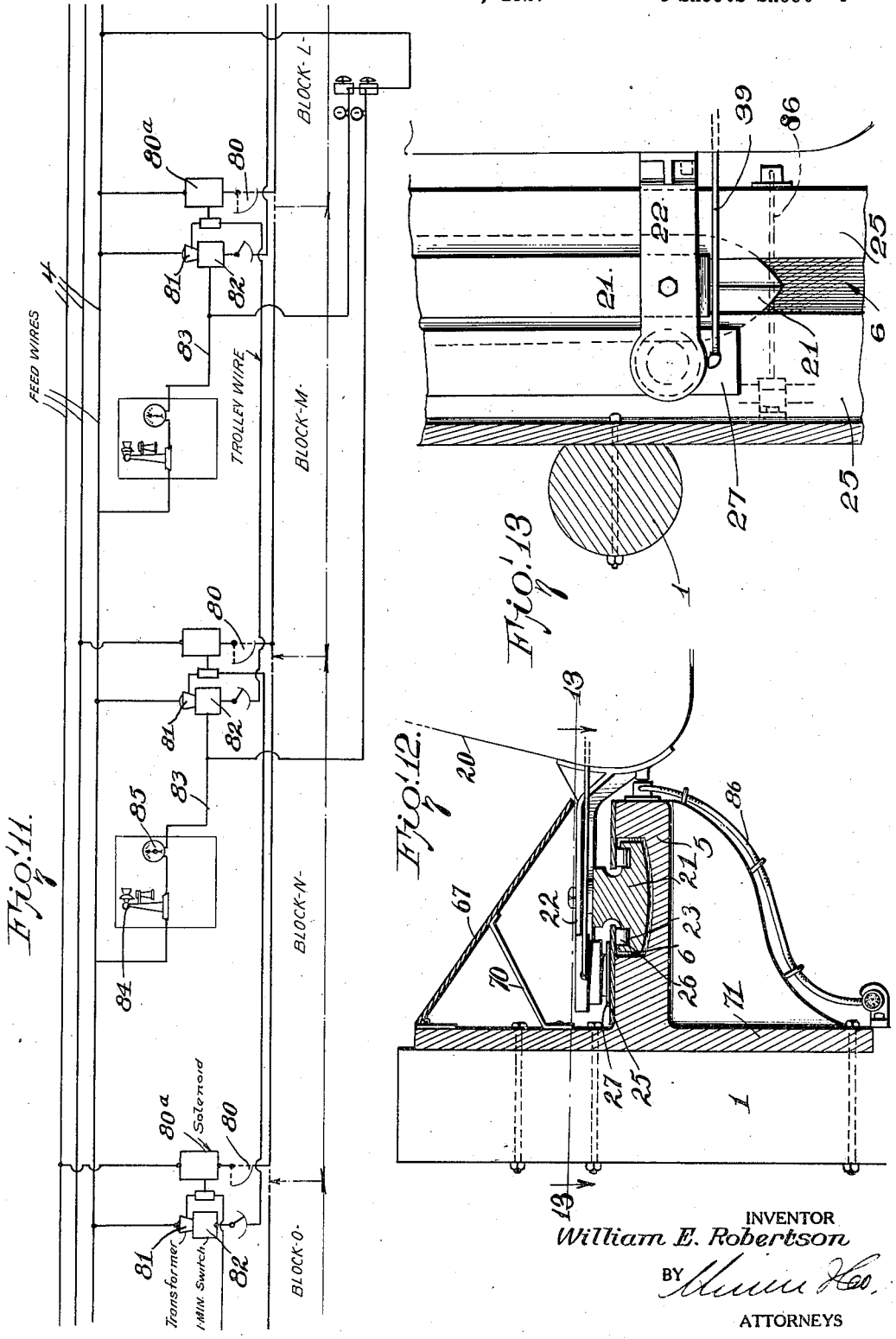

Patented Sept. 18, 1928.

1,685,035

UNITED STATES PATENT OFFICE.

WILLIAM E. ROBERTSON, OF READING, PENNSYLVANIA.

HIGH-SPEED-TRANSPORTATION SYSTEM.

Application filed June 3, 1927. Serial No. 196,276.

This invention relates to a high speed electrically operated transportation system for use on elevated tracks.

In this connection the invention recognizes that in the construction of such a system to accomplish the function of transporting articles or passengers at a very high rate of speed and in perfect safety, it is desirable to construct a guide track which offers the least resistance to the passage of the vehicle and in which friction is eliminated as far as possible. The high rate of speed required of such a vehicle renders it advisable that it be so designed as to best eliminate air resistance, and provide means whereby it is impossible for the vehicle to leave the track while in transit.

With this high speed safety transportation system in view, a primary object of the invention is to provide a vehicle for use in connection with the system, having all of the advantages of an aeroplane and of an electric car with none of their disadvantages, avoiding the anxiety caused by flying high distances from the earth as well as the dangers incident to grade crossings and traffic in surface travel.

Another object is to provide a transportation system which may be operated successfully with the employment of a comparatively small amount of labor and which, in addition to being safe to life and property while in transit, is very speedy, thus solving the problem of transportation to and from the congested business districts of large cities and for rapid and safe transportation for long distances.

In carrying out these objects, the invention is susceptible of a wide range of modification without departing from the spirit or sacrificing any of the advantages of the claimed invention; there being shown in the drawings for illustrative purposes a preferred and practical form in which;

Figure 1 represents a front elevation of two cars or vehicles used in this system shown in operative position on a double track, the rails of which are shown in transverse section.

Fig. 2 is a longitudinal vertical section through one of the cars constituting a part of the invention, parts being broken out and in section, Fig. 3 is a perspective view of one of the cars shown in operative position on the track, Fig. 4 is a detail longitudinal section of one of the brake shoes, Fig. 5 is a detail longitudinal section taken on the line 5—5 of Fig. 6.

Fig. 6 is a detail transverse section through one of the track rails and the supports therefor, showing the car supporting arm in operative engagement with the track, Fig. 7 is a detail sectional view showing the air brake operating apparatus, Fig. 8 is a section taken on the line 8—8 of Fig. 7, Fig. 9 is a detail sectional view taken on the line 9—9 of Fig. 8, Fig. 10 is a detail perspective view of the electromagnet and the cooperating disk shown in Fig. 8.

Fig. 11 is a side elevation showing a diagrammatic view of the block system employed.

Fig. 12 is a detail sectional view,

Fig. 13 is a horizontal section taken on the line 13—13 of Fig. 12.

In the embodiment illustrated an elevated track either single or double, is mounted on suitable supports here shown as posts or poles 1 of a material and size capable of supporting the weight to be carried by them. These poles or posts 1 may be of varying lengths to conform to the surface of the ground where they are used to establish an even grade for the support of the track, also to provide for proper clearance over railways, railroads and other crossings without necessitating excavation for grading the land along the right of way It is of course understood that the distance between the poles in the line will depend upon the strength of the track and the load to be supported.

Cross pieces 2 connect the parallel poles and in addition to bracing them are designed to carry the trolley wires 3 which are located a short distance below the car which travels on said track and which will hereinafter be fully described.

The structure also carries feed wires 4 which are shown carried by insulators attached to the poles and from which the electric current is never cut off since they supply current for the trolley wires 3 and also current for operating all the solenoid switches hereinafter described and control wires and communication and signal circuits necessary in the operation of the system.

Steel track rails 5 tie the poles together in one direction, while the heavy cross pieces 2 connect them transversely and produce a very substantial structure.

The track rails 5 are secured to the poles 1 at a height sufficient to produce a clearance above the ground. These rails are constructed in the form of troughs as shown clearly in Fig. 3, the grooves 6 of which are designed to receive smooth faced runners attached to the car 20 which is designed to travel over these tracks. These runners are shown at 21 and are attached to supporting arms 22 projecting laterally from the sides of the car 20 and which are designed to carry the weight of the car. Any desired number of these arms 22 may be employed according to the size of the car and the weight to be supported. These runners 21 are constructed so that it will be impossible for them to leave their place on the rails while the car is running and as shown here are made inverted T-shaped in cross section, over the flanged portion 23 of which are arranged plates 25 secured in any suitable manner to the upper face of the rail 5 and which overhang the grooves 6 therein, as is shown clearly in Fig. 6. The grooves 6 have smooth surfaces which are lubricated by oil, grease, graphite or other substance. The steel plates 25 which overhang the grooves 6 of the track also operate to hold the bearing rollers 26 in place, said rollers being arranged between said plates and the lateral extensions as shown at 23, of the runners. These plates also are designed to operate as an inverted track on which the rollers 26 will come into use in the event that the runners are lifted from their running surface of the grooves 6. It will thus be seen that these plates 25 perform a plurality of functions one of which is to cooperate with brake shoes 27 carried by the arms 22 of the car.

These brake shoes 27 carry at their opposite ends pistons 28 and 29 operable in cylinders 30 and 31 which are carried by the outer ends of the arms 22. These cylinders are shown clearly in Fig. 4 and the pistons 28 and 29 have reduced stems 32 around which are coiled springs 33 which bear at one end against the lower face of the pistons in the cylinders and at their other ends against inturned flanges 34 carried by the lower ends of said cylinders. The brake shoes 27 are carried directly above the track pillow block 7 which is nearest the pole and the springs 33 operate to normally hold said shoes out of contact with the plates 25 so that the shoes 27 will not contact with the plates 25 during the ordinary travel of the car and on which they are mounted. When the valve 37ª at the pilot's station is turned on, as will hereinafter be more fully described, or the valve 54 is open the compressed air is admitted to the top of the cylinders 30 and 31 thereby forcing the pistons therein downward and pressing the brake shoe 27 against the dry surface of the plates 25. This causes the weight of the car to be raised from the runners 21 onto the brakes and stop the car. By regulating the supply of compressed air to the brakes the car may be stopped gradually or quickly, as desired.

It will thus be seen that this method of direct air pressure on the brakes is much simpler than the method used ordinarily by railroads and that it produces a positive action with an air cushion for safety. When the air is released from the cylinders 30 and 31, the brake shoes 27 are lifted from the track by the supporting springs 33.

The car supporting arms 22 which carry the runners 21 extend straight to the outer edge of the track and there curve downward a short distance to allow the cover for the track, which will presently be described, to extend far enough from the outer track edge and below the track to protect it against rain, snow or dirt entering in on the oiled surface thereof.

The runners 21 are shaped so that they will glide easily on the lubricated track and remain in place and are preferably pointed at their front ends so that they will cleve the air and also throw out any foreign substance which might get onto the track. These runners are preferably equipped with electric heating coils 21ª similar to those used in electric flatirons, so that the oil on the track will be heated during cold weather and the frequent running of cars with heated runners will keep the oil sufficiently warm for fast travel. The current supply to these coils is controlled by two switches 21ᵇ and 21ᶜ located in the pilot room (see Fig. 2). The switch 21ᵇ controls the heating elements in the front runners while switch 21ᶜ controls those in the rear runners.

A small motor driven air compressor 35 connected with a receiver 36 is provided to supply power to the brakes and the air pressure in the receiver 36 is automatically held constant for use at all times. From this receiver 36 a pipe 37 extends to the pilot's station shown at 38 and is provided with a valve 37ª operable by the pilot for controlling the supply of air through said pipe which leads through pipe 39 to the cylinders 30 and 31 above described.

An air pressure gauge 40 is located in the air line and is located in a position to be seen from the pilot's station. A safety valve 41 is also located in the pipe 37 in advance of the cut-off valve 37ª so that when excess pressure is on the brake this valve will release it.

Near the pilot's station 38 in the car 20 is installed a small A. C. motor 45 for driving a D. C. generator 46 used for charging a storage battery 47, the generator being run continuously whether the battery is fully charged or not, an overload relay being located in the battery circuit as is usual in devices of this character. Leading from the D. C. generator are wires 48 and 49 which are first connected with the electromagnet 55 and then connect with and drive a small D. C. motor 50. This motor 50 operates to wind a cord or cable 51 on the shaft 52 of said motor. This cord 51 is connected to the handle 53 of an air valve 54 which is operable for controlling the air supplied the brakes through the pipe 37. Located between the air valve 54 and the motor 50 is an electro-magnet 55 having a small hole through the center thereof as shown at 55$^a$ in Fig. 8, through which the cord 51 passes. A steel disk 56 is secured to the cord 51 in advance of the magnet 55 and as the motor winds up the cord this disc is drawn along toward the magnet so that when the disk contacts with the magnet, it is held fast thereby and retains the air valve 54 in closed position cutting off the air from the brake.

A weight 57 is secured to the other end of the cord 51 beyond the valve 54 and said weight is held in suspension by the winding up of the cord on the motor shaft 52. When the steel disk 56 contacts the magnet it opens the circuit running to the motor 50 and stops the motor, but the current remains on the magnet coil. The current flows from the generator 46 through wires 48 and 49 to the magnet coils as shown in Fig. 7 and from there to the motor 50. Hence, should the alternating current fail for any cause, the small alternating current motor 45 driving the generator 46 will stop and thereby the current supplying the magnet coils will be cut off. This will operate to release the steel disk 56 and allow the weight 57 to drop downward exerting a pull on the cord sufficient to open the valve 54 permitting the air to immediately flow through the pipes 37 and 39 and apply the brakes. When the current is cut off, the motor shaft 52 on which the cord is wound may be easily rotated in the opposite direction to its rotation when running as a motor and allow weight 57 to drop and open valve 54 to apply the brake.

The safety valve 41 in the air line on the brake side of the air valve may be set to release at any pressure required and this will prevent a jerking stopping of the car.

The magnet 55 is mounted to move along a short distance with the steel disk 56 fastened to the cord, which is arranged to provide for momentum in the motor armature after the current is cut off the motor.

It will be observed that with this automatic air brake device that a car will be stopped in a very short distance when it enters a block with the power cut off from the trolley wires, whether the car be running along a slight grade or a heavy grade. When power is again on the trolley wire the propeller motor automatically starts and also the alternating current motor 45 driving the generator which starts the motor 50 to winding of the cord and releasing the brakes and closing the air valve 54, to cut off air to the brake and opening the valve 54 to exhaust to the atmosphere. It is to be understood that this valve 54 is similar to the air valve used on electric trolley cars except that it is automatically operated, it being constructed to have a direct opening to the atmosphere from both pipes 37. The valve 37$^a$ is also similarly constructed so that it will exhaust to the atmosphere.

The storage battery 47 is designed for emergency use in lighting of the car in case it be stopped through the current being cut off from the trolley or when a car runs into a block before the car ahead switches on the power.

As shown in Fig. 10, the magnet 55 is mounted to move with the cord 51 when the latter is being wound by mounting it in standards 59 and 60 which are pivoted at their lower ends on upstanding ears 61, said pivoting being effected by means of a rod 62 which connects the lower ends of the standards and is journaled in said ears 61 and which has coiled thereon a spring 63 for returning the magnet to normal position.

The weight 57 is shown in detail in Fig. 9 and the cord 51 is shown connected therewith by means of an eye bolt 57$^a$ and said cord is guided in its movement over a pulley 65, said weight being shown mounted to move in a well or casing 66 having a cushion 58 at the bottom thereof.

Arranged over each track rail 5 is a protector in the form of a metal shed 67 suitably braced and secured to the poles 1 and which is inclined downwardly and extends over the edge of the track a sufficient distance to protect the track against the entrance of dirt, rain, snow or other foreign substance. This shed-like protector 67 is preferably hingedly connected to the poles 1 as shown at 68 so that it may be readily raised for inspection and oiling of the track. The shed 67 is secured in lowered operative position by means of bolts 69 which pass through brace arms 70 located on the inner face of the shed and through the attaching plates 71 which are bolted to the poles 1 and which also carry the track members 5, being here shown made integral with said member although not necessarily so.

The brace arms 70 are preferably bolted to the shed 67 at 72 so that the shed will be retained in lowered operative position against the elements and yet may be released when it is desired to raise them for inspection or oiling of the track.

The cars 20 designed to be used in connection with this system are designed to give the least air resistance and are preferably shaped similar to the body of an aeroplane as shown in Figs. 1, 2 and 3.

Each car has secured to the opposite sides thereof a plurality of supporting arms 22 any desired number of which may be employed according to the size of the car and the weight to be supported thereby.

An electric motor 75 is located in the front pointed end of the car as shown clearly in Fig. 2, and is connected by a shaft 76 with a propeller 77 located outside the car at the apex of the pointed front portion thereof. This propeller 77 is similar to that used in aeroplane construction and as shown comprises two blades, but may be of any desired construction and may be located at any desired place on the car.

The motor 75 may be of any suitable construction and is so wired that the electric power will be taken from the trolley wires 3 located directly under the car. A swing 78 is attached to the lower part of the car and carries the leads from the motor and also the sliding contact which provide for the contacts 79 sliding along the power conductors or trolley wires 3. The location of the trolley wires 3 below the car eliminates largely the exposure of the wires to lightning.

An electric block system is employed in connection with this transportation system which is automatic, simple in design and of positive action and which will not allow any two cars to come within a distance of each other when running, or, if the car be stopped, the following car will be kept out of the block. The block system employed is shown in Fig. 11 of the drawings in which four blocks numbered L, M, N and O are shown in each of which is arranged a solenoid transformer and switch and numbered 80, 81 and 82, respectively, all of which are shown closed, allowing the current on the trolley wires 3 in blocks L, M and N.

The respective blocks of the system, four of which are here shown and marked L, M, N and O each has a suitable automatic reclosing switch here shown as a switch 80 with a transformer 81 and a time switch 82. The switch 80, when closed, connects the feed wires 4 with the trolley wires 3 in its respective block and permits current to flow from the feed wires through the switch to the trolley so that the car in said block may be supplied with motive power. When a car travelling in a certain block, say block L, reaches the end of the block a projection (not shown) on the car engages and opens switch 80 thereby cutting off the supply of current to the trolley wires 3 of said block and preventing the entrance into the block of a following car. The car then passes into block M and on reaching the end thereof opens switch 80 on block M and cuts off the current from block M. At this time the car also closes the time switch 82 of block M allowing the current to flow to the switch 80 of block L thereby closing a contact 83 which allows the current to energize the solenoid of the switch 80, of block L and thus close switch 80 again supplying power to the trolley wires in block L ready to operate a following car and this repeats the operation of the car ahead and as above described.

The first car continues its journey opening and closing switches 80 and 82 at the end of each block, thus making it impossible for collisions to occur.

When the passing car closes time switch 82, it not only allows current to pass through the solenoid switch but it also closes a contact in the office of the chief dispatcher and thereby closes a circuit and lights a small electric lamp to show that a car has just passed into a certain block. When the car closes time switch 82 of block M, said switch will remain closed a predetermined time, about one minute, and then open the circuit which operates the contact of the solenoid switch 80 in block L. When the current is cut off from the solenoid switch 80 of block L, the switch remains closed and continues to supply power to the trolley wires in block L until another car opens it. It will be understood that the transformers 81 are for supplying current to operate the solenoids of the switches 80.

On a thousand mile line, there will probably be about one hundred blocks or less and one small signal wire 83 running from each block to the dispatcher's board with its one hundred small lamps will tell the dispatcher exactly the block each car is in.

In each block preferably at the end thereof near where the switches are erected, will be a small house for use of a patrolman who inspects and keeps in proper condition the property in his section and each of the proposed stations has located therein one of a series of telephones 84 connecting all stations with the dispatcher's office and to be used in reporting to the dispatcher and receiving orders from him. In each station is also installed an ampere meter connected with the trolley wires in the block under the supervision of the patrolman. This ampere meter is here shown indicated at 85. This ampere meter 85 will indicate the amount of power used for the car and when any trouble exists in the wiring or in the motor, which would require an extra amount of power, like a short circuit, it will immediately show on the ampere meter and will also preferably ring a bell calling attention to the trouble. If the trouble continues the car may be stopped by the current being shut off by the patrolman in that block at the proper time to bring the car to the end of the block and an inspection made of it when stopped.

While a three phase trolley system is shown, it is of course understood any other system may be employed.

I claim:—

1. In a transportation system, a supporting structure, a lubricated guide and track carried thereby, an electric motor driven air propelled car having runners mounted to slide freely on said track, automatically operated air brakes on said car and an electric safety device for applying and releasing said brakes.

2. In a transportation system, a supporting structure, a lubricated guide and track carried by said structure, an electric motor driven air propelled car having runners mounted to slide freely on said track, means to hold said runners engaged with said track, an air braking system for controlling said cars and means whereby the brakes of said system may be operated automatically or manually.

3. In a transportation system, a supporting structure, a lubricated guide and track carried thereby, a car having runners mounted to slide freely on said track, said track having undercut grooves to receive said runners, the runners having lateral flanges to engage the undercut walls of the grooves and hold the runners in operative engagement with the track.

4. In a transportation system, a supporting structure, a lubricated guide and track carried thereby, a car having runners mounted to slide freely on said track, said track having undercut grooves to receive said runners, the runners being inverted T-shaped in cross section with the lateral flanges thereof underlying the undercut walls of the track groove to hold the runners in operative engagement with the track, and propelling means for said car.

5. In a transportation system, a supporting structure, a track having an oiled surface, a car having a smooth runner slidable on said oiled surface, heating means in said runner to maintain the oiled surface of the track in operative condition.

6. In a transportation system, a supporting structure, a track having an oiled surface, and a car having a smooth steel face runner slidable on said oiled surface, and electric heating elements in said runner to maintain the oiled surface of the track in operative condition.

7. In a transportation system, a supporting structure, a track carried thereby, a car having laterally extending arms, runners carried by said arms and slidable on said track and cooperating braking means carried by said arms and track whereby the speed of the car may be controlled at will.

8. In a transportation system, a supporting structure, a lubricated guide and track carried thereby, a car having runners mounted to slide freely on said track, means for propelling said car, and a shed arranged over said track to protect it against foreign substances and the elements, said shed being hingedly mounted to afford access to the track for cleaning and oiling.

9. In a transportation system, a supporting structure, a track carried by said structure, a car having laterally extending arms, runners carried by said arms and slidable on said track, cooperating braking means carried by said arms and track for controlling the speed of the car, and means whereby said braking means may be operated either manually or automatically.

10. In a transportation system, a supporting structure, a track carried by said structure, a car having runners slidable on said track, cooperating braking means carried by said car and track for controlling the speed of the car, motor controlled means for retaining the brake in inoperative position, and means for releasing said retaining means on the stoppage of the motor and thereby apply the brakes.

11. In a transportation system, a supporting structure, a track carried by said structure, a car having runners slidable on said track, cooperating braking means carried by said car and track for controlling the speed of the car, means for supplying and exhausting compressed air to apply and release the brakes, electric driving means for the car, and actuating means for said braking means automatically controlled by the car driving means whereby when the car driving means is cut off the brakes will be applied and when it is turned on the brakes released.

12. In a transportation system, a supporting structure, a track carried by said structure, a car having runners slidable on said track, cooperating braking means carried by said car and track for controlling the speed of the car, a motor controlled magnet for retaining the brakes in inoperative position when the magnet is energized, said retaining means being released on the de-energizing of the magnet thereby permitting the brakes to be applied.

13. In a transportation system, a supporting structure, a track carried by said structure, a car having runners slidable on said track, cooperating braking means carried by said car and track for controlling the speed of the car, electrically operated means for driving the car, a motor controlled by said driving means, means controlled by said motor for retaining the brakes in inoperative position and, means for releasing said retaining means operable on the stoppage of the motor whereby the brakes are applied.

WILLIAM E. ROBERTSON.